United States Patent [19]

Meiller et al.

[11] 4,226,385

[45] Oct. 7, 1980

[54] RETRACTOR FOR SAFETY BELTS

[75] Inventors: Hermann Meiller, Amberg; Horst Hocke, Mimbach; Otto Kunst, Michael-Poppenricht; Paul Hartl, Amberg, all of Fed. Rep. of Germany

[73] Assignee: Messrs. Willibald Grammer, Amberg, Fed. Rep. of Germany

[21] Appl. No.: 936,686

[22] Filed: Aug. 25, 1978
(Under 37 CFR 1.47)

[30] Foreign Application Priority Data

Aug. 25, 1977 [DE] Fed. Rep. of Germany ....... 2738312

[51] Int. Cl.³ ...................... A62B 35/00; B65H 75/48
[52] U.S. Cl. ............................................. 242/107.4 R
[58] Field of Search ................. 242/107.4 R–107.4E, 242/107.6, 107.7, 107.12; 297/388; 280/803, 806, 807, 808

[56] References Cited

U.S. PATENT DOCUMENTS

| 1,945,842 | 2/1934 | Witchger | 242/107.6 X |
| 2,080,815 | 5/1937 | Gasstrom | 242/107.6 X |
| 3,347,488 | 10/1967 | Quinting | 242/107.4 R |
| 3,511,450 | 5/1970 | Aweimrine | 242/107.4 A |

FOREIGN PATENT DOCUMENTS 1016223 1/1966 United Kingdom ............. 242/107.4 R Primary Examiner—John M. Jillions

[57] ABSTRACT

A retractor for safety belts having a winding shaft acted upon by a retracting spring, and journaled in a housing so as to be non-displaceable axially, a detent disk provided with detent elements distributed over its periphery and fixed to the winding shaft, and a counter-detent member anti-rotationally joined to the housing and having at least one counter-detent element. The detent disk is disposed fixedly in the axial direction on the winding shaft while the counter-detent disk is axially displaceable on the winding shaft between the detent disk and a housing wall and is secured against rotation by lugs extending from the housing wall approximately parallel to the winding shaft towards the detent disk and engaging notches in the counter-detent disk. A spring extends between the counter-detent disk and the housing wall. A pushbutton displaceable axially to the winding shaft serves as actuating member for the counter-detent disk and grips the same.

8 Claims, 6 Drawing Figures

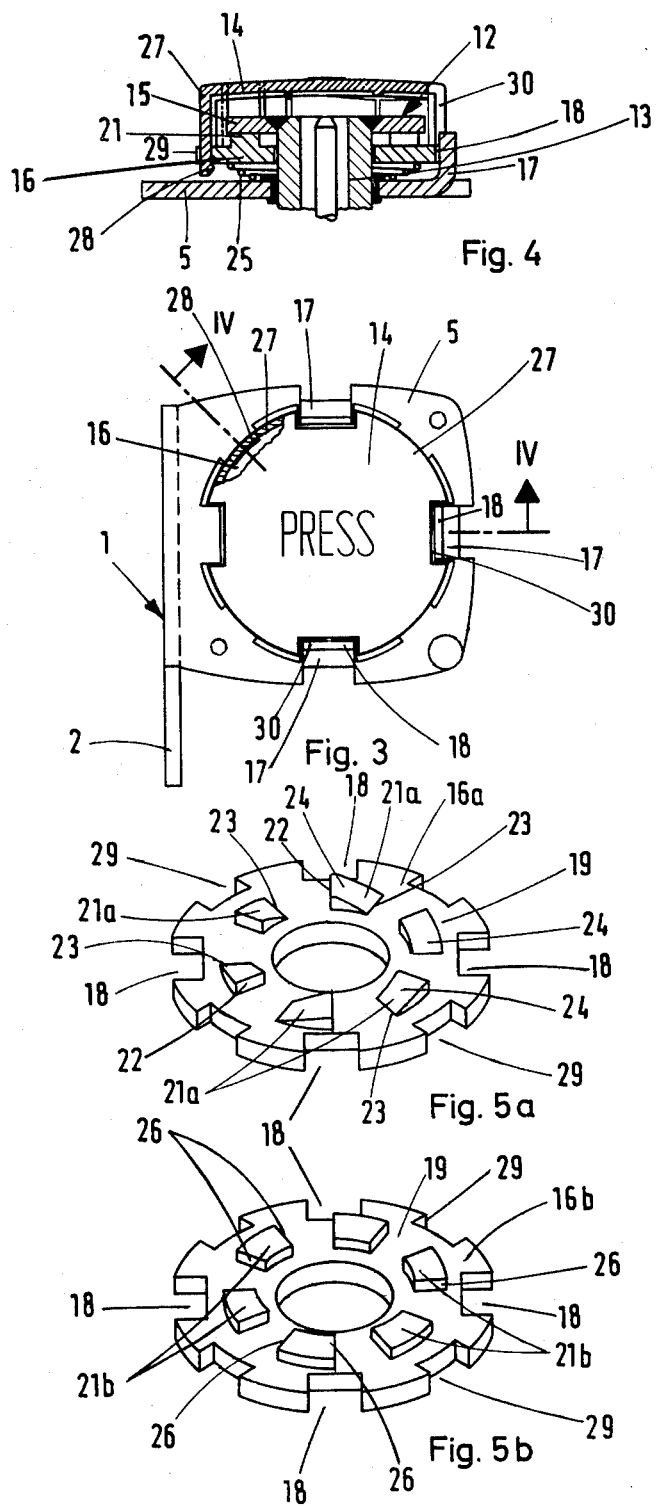

RETRACTOR FOR SAFETY BELTS

The invention relates to a retractor for safety belts, having a winding shaft mounted in a housing and driven by a retractor spring, for the retraction of the safety belt fastened to it.

Safety belts, in which the winding shaft is driven by a retractor spring, and are therefore automatically rewound when not in use, are called automatic safety belts. In normal operation, the belt can easily be unwound from the winding shaft against the action of the retractor spring, so that it can adapt itself without difficulty to the position of the seat or to the body size and proportions of the user. The arresting of the belt in case of danger, that is, upon excessive deceleration of the vehicle, is accomplished by means of a special deceleration-activated mechanism, and many different designs of such mechanisms are known. Virtually all known safety belts of this kind have the peculiarity that the automatic arrest responds to severe vibration of the vehicle. On the other hand, however, in the known safety belts, the automatic mechanism operates only if the belt housing is in certain angular positions. In particular, when the winding shaft is excessively inclined with respect to the horizontal position, either the response of the mechanism is no longer reliable or the arresting action is constantly engaged, so that in that case the adjustment of the belt to the necessary length cannot be made. For this reason, it has hitherto been considered inadvisable to provide such safety belt systems in vehicles which are subject to severe vibration in operation or are frequently operated on steep grades, such as for example tractors, construction vehicles, etc. In these vehicles it has been recommended to use fixed belts, i.e., belts which were relatively difficult to adjust to the necessary length, the result being, of course, that frequently these belts are not applied.

It is the object of the invention to create a retracting device for a safety belt, which will basically have the advantages of an automatic belt with regard to ease of changing its length, but on the other hand will also be suitable for severe conditions of operation, i.e., for use on tractors, construction vehicles or the like.

For the achievement of this object, it is proposed in accordance with the invention to construct a retractor of the kind described above, so as to provide a detent mechanism for the winding shaft, which will prevent at least the unwinding of the belt from the winding shaft and which can be released from its engaged state by means of an actuator.

According to the proposal made by the invention, therefore, a retractor for the safety belt is obtained, in which the belt is automatically wound up by the retractor spring in a known manner if it is not in use. On the other hand, the belt can be pulled out from the retractor to the extent necessary for adjustment to the user. Up to this point, therefore, the belt in accordance with the invention corresponds to the known automatic belts. In the retractor of the invention, however, the arresting of the belt is not actuated by means of a mechanism responding to particular deceleration or acceleration values. Instead, when the correct setting is reached, the belt is locked at that length by releasing the actuator, so that reliable protection is afforded to the wearer. Consequently, the retractor of the invention affords safety even under very rough operating conditions, e.g., on tractors or construction vehicles. On the other hand, however, the convenience with regard to length adjustment which is characteristic of automatic safety belts is obtained.

Fundamentally, it would be sufficient if, in the retractor of the invention, the detent mechanism would prevent only the unwinding of the belt, in order to protect the user. It may be very advantageous, however, for the detent mechanism to be designed so that, when it is in its locked state, it prevents both retraction and unwinding. For if only the unwinding of the belt is prevented, it can happen under certain circumstances that the detent will engage during normal driving in a position other than the one originally set, so that the belt may then be uncomfortably tight for the user. If, on the other hand, it is designed so that locking prevents both winding and unwinding, the setting of the belt will remain unaltered, and the user can select any setting which is comfortable for him.

To further increase the comfort of the wearer, it is proposed that the detent, when in the applied state, will provide some play in the winding and unwinding of the belt as required for the necessary movement of the belted person's body. This is accomplished in a simple manner, for example, by an appropriate spacing apart of the detent positions, although care must be taken to see that the play is not sufficient to impair the desired safety.

It is desirable to construct the detent system such that it will have a detent disk affixed to the winding shaft and bearing detent elements distributed about its periphery which cooperate with a counter-detent disk mounted on the housing, which is resiliently biased to the engaged position and can be released from the engaged position against the spring bias by means of the actuator. Such a detent disk can be very easily mounted on the winding shaft. Furthermore, there are many possibilities for the design of the detent elements.

If a detent disk is used, it is desirable for the counter-detent means to be in the form of a disk which is axially displaceable with respect to the winding shaft but secured against rotation, and having at least one counter-detent element, and for this counter-detent disk to be urged against the detent disk by a compression spring, preferably a conical coil spring, surrounding the winding shaft.

The detent elements and counter-detent elements can be made in a variety of shapes. An embodiment, however, has been found to be desirable, for reasons of ease of manufacture and of stability, in which the detent disk and the counter-detent disk have on their confronting faces axially projecting teeth disposed in a circumferentially spaced relationship and having radially disposed edges of identical orientation on each disk, which, when the disks engage one another, form cooperating, confronting abutments serving as detent and counter-detent elements.

In one embodiment of the retractor, which is intended to offer security only against unintentional unwinding of the belt, the teeth on the detent and the counter-detent disks are so designed that the radial edges of the detent wheel which are foremost in the rotation of the winding shaft for the unwinding of the belt, and the oppositely facing edges of the teeth of the counter-detent disk, are designed as abutments, while the other, second radial edges merge into ramp surfaces gradually rising from the face of the disk to the first radial edges. Due to the presence of the ramp surfaces, the reversal of the winding shaft for the winding of the belt under the action of the retractor spring is facilitated.

The locking of the winding shaft against rotation in both directions, however, is advantageously achieved by designing the teeth such that they will have on both their sides radial edges designed as abutments.

The production of the teeth in both disks is accomplished in an especially simple manner by a pressing or stamping process in such a manner that the teeth are formed by embossing the disks.

For the simple mounting of the counter-detent disk, it is proposed by the invention that it be mounted on the winding shaft between the detent disk and a housing wall in which one end of the winding shaft is journaled, and that it be secured against rotation by securing means projecting approximately parallel to the winding shaft from the housing wall towards the detent disk, such securing means being advantageously formed by lugs bent from the housing wall engaging in notches in the counter-detent disk. In this design, no special mounting elements are needed for the counter-detent disk.

Lastly, it lies within the scope of the invention that the actuating means is in the form of a pushbutton which can be displaced axially to the winding shaft and which extends cap-wise around the detent disk and with its rim grips the counter-detent disk, the rim advantageously being snapped onto the counter-detent disk. This type of construction of the actuator has the advantage of requiring little space and providing high reliability of operation. Furthermore, it is extremely easy to assemble.

Additional features, details and advantages of the invention will appear from the following description of a preferred embodiment, in conjunction with the drawing wherein:

FIG. 3 is a side elevational view taken from the side of the retractor bearing the pushbutton;

FIG. 4 is a cross section taken along line IV—IV of FIG. 3, and

FIGS. 5a and 5b represent two different embodiments of the detent disk, the embodiment shown in FIG. 5a being used if security only against the unwinding of the safety belt is desired, and the embodiment shown in FIG. 5b preventing rotation in either direction when the detent means is in the engaged state.

Figure 2:
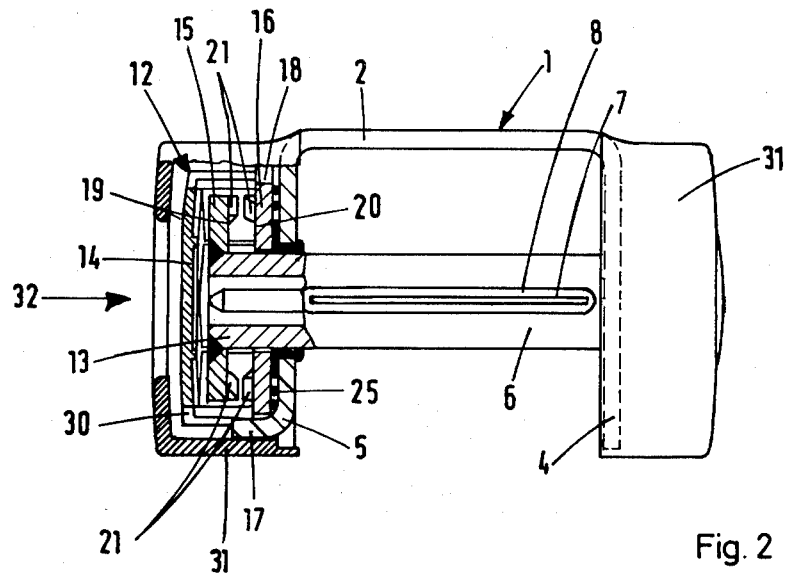
FIG. 2 is a section similar to FIG. 1, in which, however, the detent means is shifted from the engaged to the released state.

The retractor represented in the drawing has a housing 1 which, as best seen in FIG. 2, is of an inverted U-shaped configuration and comprises a back 2 having an aperture 3 for mounting, and sidewalls 4 and 5 approximately perpendicular thereto, which form the limbs of the U. In the sidewalls 4 and 5 there is journaled in a known manner a winding shaft 6 to which one end of a safety belt 7 is fastened by means, for example, of a pin 8. The winding shaft 6, at its one end 9 projecting beyond the sidewall of the housing 1, is subject to the action of a retracting spring 10 which tends to turn the winding shaft 6 in the direction in which the safety belt 7 is wound up. The safety belt 7 can thus be unwound from the winding shaft 6 by pulling it in the direction of the arrow 11. If the pull in the direction of the arrow 11 ceases, however, the safety belt 7 will automatically rewind itself onto the winding shaft 6 under the action of the retracting spring 10.

The special feature of the retractor of the invention is to be seen in the fact that the winding shaft 6 is associated with a special detent means designated generally by the number 12, which is disposed adjacent the end 13 of the winding shaft 6 which projects through the other sidewall 5 of the housing. The detent means 12 is so constructed that it is normally in an engaged state, represented in FIGS. 1 and 4, in which any rotation of the winding shaft 6 tending at least to unwind the safety belt 7 in the direction of the arrow 11 is prevented, but by means of an actuator in the form of a pushbutton 14 it can be shifted to a released state represented in FIG. 2, in which the free winding and unwinding of the safety belt 7 is possible, with a corresponding rotation of the winding shaft 6.

The detent means 12 comprises a detent disk 15 affixed to the end of the winding shaft 6, and a substantially similar counter-detent disk 16 which, as will be explained further below, can be of different designs corresponding to the representations in FIGS. 5a and 5b.

The detent disk 15 is affixed to the winding shaft 6, so that it will not shift axially and will rotate together with the winding shaft 6. The counter-detent disk 16 is mounted loose on the end 13 of the winding shaft 6 and can be shifted axially in relation to winding shaft 6, as can be seen from a comparison of FIGS. 1 and 2. Rotation of the counter-detent disk 16, however, is prevented by the fact that the housing sidewall 6 has lugs 17 bent over approximately parallel to the winding shaft 6, such lugs 17 being shown at angular intervals of 90° from one another in the embodiment shown in FIG. 3, and engaging corresponding notches 18 (FIGS. 5a and 5b) in the circumference of the counter-detent disk 16.

Both the detent disk 15 and the counter-detent disk 16 have on their confronting faces 19 and 20, respectively, a plurality of teeth 21 disposed at uniform angular distances from one another and serving as detent and counter-detent elements. In the illustrated embodiments, six such teeth 21 are provided on each disk. These teeth can be of different design as illustrated in FIGS. 5a and 5b. The production of the teeth 21 can be accomplished in an especially simple manner by stamping them out of the detent and counter-detent disks 15 and 16.

If it were desired only to prevent the undesired unwinding of the safety belt 7 in the direction of arrow 11, the detent disk 15 and the counter-detent disk 16 would be made as in FIG. 5a. In this case the counter-detent disk 16a has teeth 21a forming an abutment 22 on their radially disposed edge. The other radially disposed edge 23 is connected to the abutment 22 by a sloping ramp surface 24. The detent wheel 15, which is used in conjunction with the counter-detent wheel 16a, is made in the same way, that is, it also has teeth 21a which have an abutment on one side and a ramp surface on the other, although the arrangement is such that the abutments 22 of the detent disk 15 and of the counter-detent disk 16a confront one another.

Figure 1:
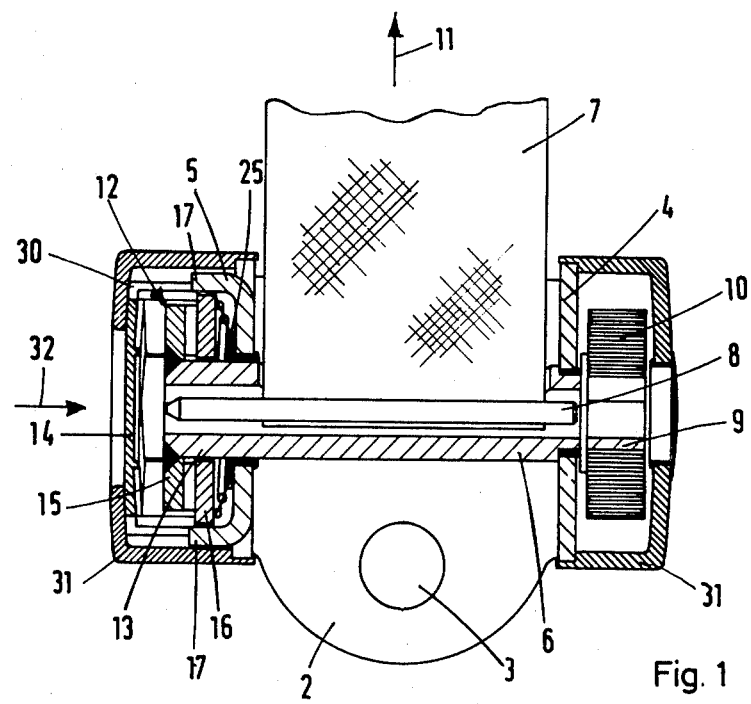
FIG. 1 represents an axial cross section through the retractor with the detent means in the engaged state.

As shown in FIGS. 1 and 2, the counter-detent disk 16 is disposed for axial displacement on the winding shaft 6 or its end 13 between the detent disk 15 and the housing sidewall 5. The counter-detent disk 16 is pressed by a truncoconical compression spring 25 surrounding the end 13 of the winding shaft 6 into engagement with the detent disk 15, thereby causing the teeth 21 or teeth 21a or 21b of the detent disk and counter-detent disk to cooperate with one another in the engaged state.

If teeth designed as illustrated in FIG. 5a are present, i.e., teeth 21a having a ramp surface 24 and an abutment surface 22, the rotation of the winding shaft 6 is prevented in only one direction, namely, when the abutment surfaces 22 of teeth 21a engage one another under the action of the spring 25. The winding up of the belt 7 in the direction opposite that of arrow 11 under the effect of the retracting spring 10, on the other hand, is possible since in this case the ramp surfaces 24 of the teeth slide over one another and the counter-detent disk 16a can be deflected axially to permit this.

If it is desired by means of the detent means 12 to prevent rotation of the winding shaft 6 both in the winding and in the unwinding direction, detent disk 15 and counter-detent disk 16b are made as shown in FIG. 5b. In this embodiment, teeth 21b are provided which have abutment surfaces 26 in a substantially radial alignment. In this design, when the teeth 21b of the detent disk 15 and counter-detent disk 16b mesh with one another, rotation of the detent disk 15 with respect to the counter-detent disk 16b is reliably prevented in both directions.

In the embodiments represented in FIGS. 5a and 5b, the teeth 21a and 21b are situated at relatively small angular intervals on the counter-detent disk 16a and 16b, respectively, the result being that, when the detent means are engaged, these two disks can rotate against one another to only a relatively small degree, so that the belt 7 will substantially retain its length once it has been set. For special purposes, however, it may be desirable to provide a certain amount of free play of the winding shaft 6 or detent means 12, as the case may be, so as to permit the belt 7 to wind and unwind to the degree necessary for the normal movement of the body of the person belted. This can be brought about in a simple manner by providing for an appropriate angular distance between teeth 21a or 21b or by reducing their circumferential width.

To enable the detent means to be shifted from its engaged state illustrated in FIGS. 1 and 4 to a released state, an actuating means in the form of a pushbutton 14 is provided. The pushbutton 14 is of a cap-like configuration in the illustrated embodiment. It has circumferential sections 27 reaching around the detent disk 15, as best seen in FIGS. 3 and 4.

In the area of the circumferential sections 27, the pushbutton 14 is supported at least section-wise on the periphery of the counter-detent disk 16 or 16a or 16b. Furthermore, approximately at the center of each circumferential section 27, a radially projecting bead 28 is provided, whereby the pushbutton 14 is snapped onto the counter-detent disk 16 or 16a. The beads 28, of which four are provided, for example, are engaged in notches 29 on the circumference of the counter-detent disks 16, 16a and 16b.

The pushbutton 14 is furthermore provided in its periphery with openings 30 which are engaged by the lugs 17 of the housing sidewall 5 in the assembled state shown in FIGS. 1 to 4.

Lastly, it is to be noted that covers 31 can be attached to the sidewalls 4 and 5 of housing 1 to protect and conceal the retractor spring 10 and the detent means 12. These covers 31 can be made of plastic, for example, and can be mounted simply by snapping them onto the sidewalls 4 and 5.

The manner of operation of the belt retractor of the invention is the following:

If the detent means 12 is in the engaged state, as it is in FIGS. 1 and 4, for example, the counter-detent disk 16 is urged by the spring 25 against the detent disk 15, and the result is that the abutment surfaces 22 and 26 of teeth 21 are engaged with one another. If the teeth are of the kind shown in FIG. 5a, the unwinding of the safety belt 7 in the direction of the arrow 11 is prevented, but the belt 7 can be retracted in the direction opposite that of arrow 11 under the action of the retraction spring 10, the counter-detent disk 16 being deflected away from the detent disk 15 each time two ramp surfaces 24 of teeth 21a encounter one another. If the teeth are like teeth 21b of FIG. 5b, however, any further rotation of the detent disk 15 with respect to counter-detent disk 16 is rendered impossible, since the abutment surfaces 26 of teeth 21b will engage one another after a slight relative rotation of disk 15.

Now, if the user desires to change the length of belt 7 and to turn winding shaft 6 for this purpose such that the belt can be pulled out, or if, in the case of a design in accordance with FIG. 5b, he wants the belt 7 to be retracted under the action of the retracting spring 10, he will press the pushbutton 14 axially in the direction of the arrow 32, and this, as it can be seen in FIG. 2, will shift the counter-detent disk 16 against the action of the spring 25 toward the housing wall 5, thereby removing it from the detent disk 15 so far that teeth 21 will no longer be able to engage one another. The detent disk 15 can then turn freely with respect to the counter-detent disk 16, and thus the belt can be wound or unwound. However, as soon as the pushbutton 14 is released, the counter-detent disk 16 will return to the engaged position of FIG. 1 under the action of the compression spring acting on it, in which position rotation of the winding shaft 6 will be prevented at least in the direction corresponding to the unwinding of belt 7.

We claim:

1. A retractor for a safety belt, comprising: a housing having a housing wall, a winding shaft having one end journaled in said housing wall so as to be non-displaceable axially of said shaft, a retracting spring acting on said shaft, for winding up the safety belt to be fastened to it, detent means between the housing and winding shaft and including a detent disk provided with detent elements distributed over its periphery, and being fixed to said winding shaft, and also including a counter-detent disk mounted so as to be axially displaceable on the winding shaft between the detent disk and said housing wall and having at least one counter-detent element and notches, means securing said counter-detent disk against rotation, said securing means being connected to the housing wall and extending from the housing wall approximately parallel to the winding shaft and engaging said notches in the counter-detent disk, a spring for forcing said counter-detent disk into locking engagement with said detent disk, said spring being provided between the counter-detent disk and the housing wall, and an actuating member for actuating said axially displaceable counter-detent disk for releasing said spring, said actuating member forming a pushbutton displaceable axially to the winding shaft and overreaching the detent disk in a caplike manner and having a lip gripping the counter-detent disk.

2. Retractor of claim 1, wherein said securing means are formed by bent-over lugs of the housing wall.

3. Retractor of claim 1 or 2, wherein said lip is snapped onto the counter-detent disk so as to be connected thereto.

4. Retractor of claim 1, wherein said detent and counter-detent disks bear on their confronting faces axially projecting teeth which are disposed at angular intervals, and which have radially disposed edges aligned on each disk, which, when the teeth engage one another, form abutments cooperating with one another and confronting one another, and which serve as said detent elements and counter-detent elements.

5. Retractor of claim 4, wherein first radial edges of the teeth of the detent disk, which form the leading edges when the winding shaft rotates for unwinding of the belt and the oppositely facing edges of the counter-detent disk, are constructed as abutments, while other, second radial edges are adjoined by ramp surfaces rising gradually from the face of the disk to the first radial edges.

6. Retractor of claim 4, wherein the teeth have on their sides radial edges which are in the form of abutments.

7. Retractor of claim 4, wherein the teeth are formed of embossments of the disks.

8. Retractor of claim 1, wherein said detent means is constructed such that the winding and unwinding of a belt mounted on said shaft are prevented when said disks are engaged.

* * * * *